United States Patent [19]

Evgenievich et al.

[11] 4,383,556

[45] May 17, 1983

[54] CRACK ARRESTING DEVICE FOR LIMITING PROPAGATION OF CRACKS IN WELDED STRUCTURES FABRICATED FROM SHEETS

[76] Inventors: Paton B. Evgenievich, ulitsa Chkalova, 41a kv. 26; Biletsky, S. Mikhailovich, ulitsa Vernadskogo, 69a kv. 9; Tereschenko A. Fedorovich, bulvar Lesi Ukraninki, 2, kv. 66; Barvinko J. Pavlovich, Darnitsky bulvar, 9, kv. 41, all of Kiev, U.S.S.R.

[21] Appl. No.: 233,200

[22] Filed: Feb. 10, 1981

[51] Int. Cl.³ ............................................. F16L 13/02
[52] U.S. Cl. ................................. 138/172; 138/142; 138/143; 138/153; 138/155; 138/178; 228/184
[58] Field of Search ............... 138/172, 177, 103, 158, 138/178, 171, 142, 141, 143, 155; 428/43; 228/160, 161, 184, 225, 226

[56] References Cited

U.S. PATENT DOCUMENTS

| | | | |
|---|---|---|---|
| 3,205,094 | 9/1965 | Erlandson | 428/43 |
| 3,664,379 | 5/1972 | McCabe | 138/171 X |
| 3,680,584 | 8/1972 | Pierart | 138/142 X |
| 3,704,509 | 12/1972 | Yamauchi | 228/184 |
| 3,746,050 | 7/1973 | Born et al. | 138/171 X |
| 3,880,195 | 4/1975 | Goodrich et al. | 138/172 |
| 4,095,594 | 6/1978 | Paton et al. | 228/184 X |
| 4,244,482 | 1/1981 | Baumgart et al. | 138/142 X |

FOREIGN PATENT DOCUMENTS

| | | | |
|---|---|---|---|
| 869360 | 4/1971 | Canada | 138/171 |
| 1400504 | 10/1968 | Fed. Rep. of Germany | 138/177 |
| 688754 | 9/1979 | U.S.S.R. | 138/172 |

OTHER PUBLICATIONS

"Impact Testing of Metals", ASTM Special Technical Publication, 1969, E. Norris and R. White, p. 207.
V. M. Finkel, "Fizika razrusheniya", Metallurgiya, M., 1970, p. 280.
cf. "Razrushenie", t.5, Mashinostroenie, M., pp. 40–43.

Primary Examiner—Stuart S. Levy
Assistant Examiner—Daniel P. Stodola
Attorney, Agent, or Firm—Fleit, Jacobson & Cohn

[57] ABSTRACT

A crack arresting device for limiting crack propagation in welded sheet structures, is made in the form of a multi-layer section of the structure, integrally interposed therein. At least in one layer of the section there is provided at least one slot located at an angle to a probable crack propagation path.

9 Claims, 5 Drawing Figures

CRACK ARRESTING DEVICE FOR LIMITING PROPAGATION OF CRACKS IN WELDED STRUCTURES FABRICATED FROM SHEETS

BACKGROUND OF THE INVENTION

1. Field of the Invention

The invention relates to the fabrication of welded constructions, and more specifically is concerned with an apparatus for limiting propagation of cracks in welded sheet constructions.

The invention can be used to prevent propagation of brittle and ductile fractures in such welded sheet constructions as ship hulls, walls of oil tanks, etc.

The invention is of particular advantage in the case of gas pipelines used at low ambient and operating temperatures, wherein it can be advantageously applied to provide crack arresting means at the places of the most probable paths of avalanche-type propagation of fractures.

2. The Prior Art

There is known a crack arrestor made in the form of guard plates riveted over a through slot provided in a ship hull or in a wall of a reservoir and located in the path of the most probable path of fractures perpendicular to the direction thereof (V. M. Finkel, "Fizika razrusheniya", "Metallurgiya", M., 1970, p. 280). In some constructions, however, riveted joints cannot be used, and in particular in the case of high-pressure gas transmission pipelines wherein riveted joints do not provide the strength and tightness of the pipeline. The use of weld joints in this case also does not yield the required results since a crack, in one occurs, propagates through the weld joints and guard plates further along the pipeline.

There is also known a crack arrestor ("Razrushenie", t.5, Mashinostroenie, M., pp. 40-43) constructed in the form of a stack of plates built-in in the most probable path of crack propagation, which crack arrestor is, in other words, a multi-layer section integrally interposed at a certain place of a construction made of sheets, that is in the place of probable formation of cracks in ship hulls, walls of tanks or at the sections of gas pipelines, fractures in which sections may cause breakdown at other associated installations.

In the case of using a crack arrestor, when a propagating crack reaches the multi-layer stack of plates it changes it velocity and direction, slows down and stops propagating, which arresting effect is produced due to different properties of materials and specific conditions of the propagation of cracks in a multi-layer stack of plates.

The length of such a multi-layer crack arrestor is determined by the length of the crack path, within the crack arrestor, at which said crack can be arrested. In the case of avalanche-type fracturing in a highly pressurized construction, in particular such as a gas transmission pipeline fabricated from large diameter pipes (1200-1400 mm) the velocity of crack propagation may be as high as 400-600 m/s. It is therefore quite evident that such a crack arrestor should have a large size in the direction of probable fracture path, and hence, correspondingly expensive. In addition, in the case of ductile fracturing the fracture limiting effect will be of a low efficiency since the ductile properties of the said stack of plates having the same thickness will be close to the corresponding properties of the material in which ductile fractures occur.

SUMMARY OF THE INVENTION

An object of the invention is to provide a crack-arresting device which is capable of limiting with a high reliability the propagation of cracks within a short path thereof inside the device.

The object of the invention is attained in that in a crack-arresting device for limiting the propagation of cracks in a welded structure fabricated of sheets, made in the form of a multi-layer section of said structure integrally interposed therein, according to the invention at least in one layer of said section there is provided at least one slot located at an angle to the direction of the crack propagation.

Such construction will allow the propagating crack to be arrested at a short length of the path thereof within the body of the crack-arresting device, due to the fact that having reached the slot the crack stops propagating at its one defining edge without being capable to form again at the other defining edge of the slot.

It is expedient that the slots be brought in coincidence at least in two layers of the crack arresting device.

In order to provide for a tightness of the structure it is advisable that at both sides of each slot in each of outer layers of said multilayer section be formed melted-through weld joints.

It is also expedient that in the case of a pipeline the multi-layer section have a form of a pipe whose layers are arranged along the Archimedean spiral, that is, the layers are wound along a spiral normal to the longitudinal axis of the pipe, and that the length of each slot correspond at least to the length of one turn of the multi-layer section.

In addition, the slots provided in the layer may run parallel to each other. To ensure the tightness of the structure one of the inner layers of the multi-layer section should be made continuous.

BRIEF EXPLANATION OF THE DRAWINGS

The invention will now be explained in greater detail with reference to embodiments thereof which are represented in the accompanying drawings, wherein.

DETAILED DESCRIPTION OF THE INVENTION

Figure 1:
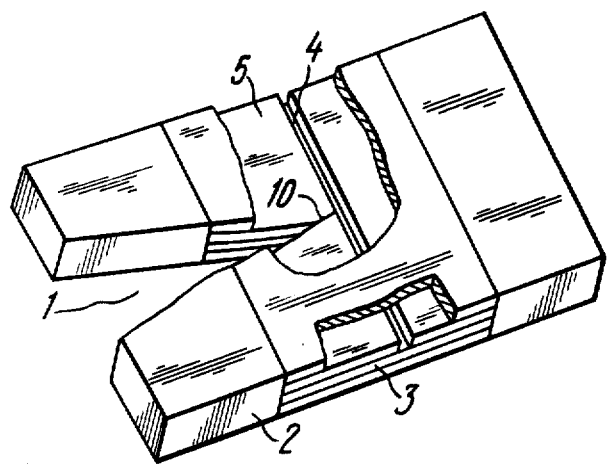
FIG. 1 is a schematical representation of the crack-arresting device of the invention, constructed in the form of a multi-layer section interposed in a welded structure fabricated from sheets, with a partially exploded view of one layer.

A crack-arresting device 1 is illustrated in FIG. 1 in a welded structure made of sheets 2, such as a ship hull, pressurized containers, gas transmission pipelines, etc. The device 1 is in a portion of the structure made in the form of a multi-layer section thereof integrally interposed therein and having a slot 4 at least in one layer 5 of the multi-layer section 3, which slot is located at an angle to the probable direction of propagation of the crack 10.

To decrease the length of the slot and raise the probability of intercepting the apex of the crack by the respective slot it is expedient that the slot be located relative to the most probable direction of the crack path at an angle close to 90°.

Figure 2:
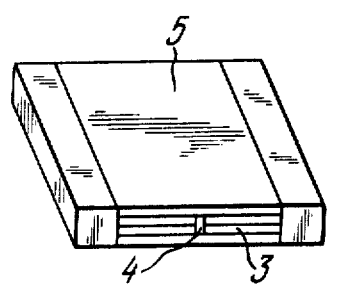
FIG. 2 is a schematical representation of one modification of the crack-arresting device of the invention, wherein the slots in two layers coincide, axonometric view.

The slots 4 may be located in the layers 5 of the multi-layer section 3 in spaced relationship or brought in coincidence at least in two layers of said section 3, as illustrated in FIG. 2.

Figure 4:
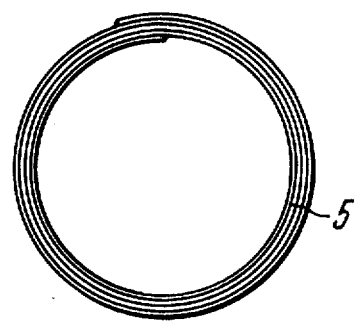
FIG. 4 is a schematical representation of a further modification of the crack-arresting device of the invention, end face view.

The tightness of the structure incorporating the multi-layer section 3 as a crack arresting device may be ensured by providing at both sides of each slot 4 of outer layers of the multi-layer section 3 melted-through weld joints 6, as in FIG. 4.

Figure 5:
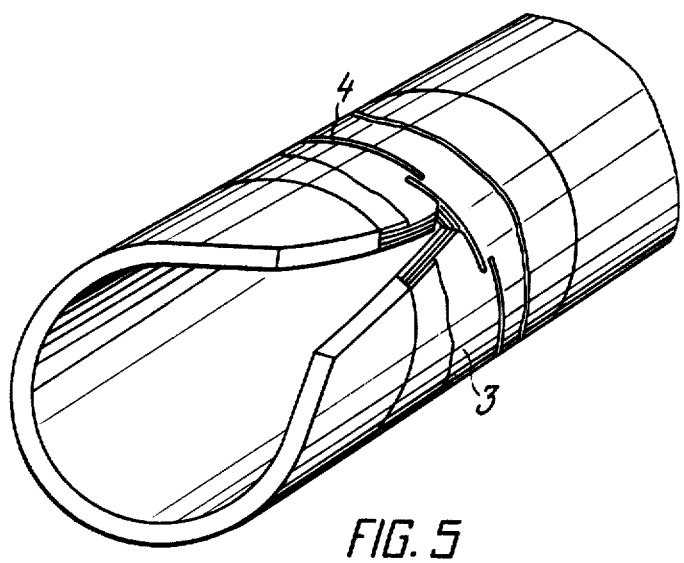
FIG. 5 schematically represents a mechanism of arresting the crack within the multi-layer section.

When the welded structure 2 fabricated of sheets is a pipeline, as in FIG. 4, the multi-layer section 3 is made in the form of a pipe having its layers 5 disposed along the Archimedean spiral, that is, the layers are wound along a spiral normal to the longitudinal axis of the pipe, with the length of each slot 4 being equal at least to the length of one turn of the multi-layer section 3, as illustrated in FIG. 5.

Figure 3:
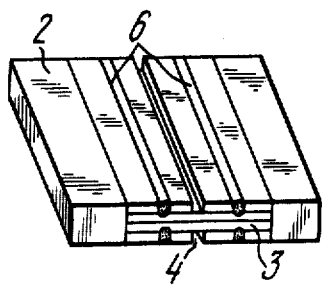
FIG. 3 is a schematical representation of another modification of the crack-arresting device of the invention, wherein outer layers of the multi-layer section are provided with melted-through weld joints, axonometric view.

In addition, the slots in the layer of the section 3 may run in parallel to each other, as illustrated in FIGS. 1–3.

To ensure the tightness of the multi-layer section 3 at least one of its inner layers 5 should be made continuous.

Arresting the propagation of cracks with the aid of the proposed apparatus is effected in the following manner.

A propagating crack 10 (FIG. 1) enters the body of the multi-layer section 3 and, having reached the slot 4 edge, stops propagating without being capable of forming at the opposite edge thereof.

The proposed multi-layer section is manufactured in the following way. Before being assembled into a multi-layer section some of the plates are provided with slots which are made with the aid of a mill or a thin grindstone. Thereafter the plates are assembled into a multi-layer stack of plates so that the slots are located relative each other in accordance with the specific embodiment of the invention.

The proposed crack arresting device for use in a pipeline is manufactured from a strip which is first straightened and then cut to the required size, with the number of separate plates corresponding to the required number of layers, whereafter a slot or slots are made in the plates to the required shape and length. The thus produced blanks are then shaped to a required form.

To determine the efficiency of the proposed device two 160 m pipeline sections assembled from 1420 mm pipes were tested by pneumatic pressure. The temperature of the pipe during test was 15° C., and the air pressure inside thereof was 7.5 megapascals.

At the middle portion of each pipeline section there was provided a slit, and from the both sides thereof and at a certain distance therefrom there were interposed multi-layer sections to function as a crack arresting device of the invention.

The test was effected by exploding a trinitrotoluene charge fixed on the said slit to produce a brittle crack in one pipeline section and a ductile crack in the other one. In the both cases the cracks managed to propagate only until the slots provided in the multi-layer section, while the portions of the pipeline sections after the crack arresting devices remained unaffected.

The use of the proposed crack-arresting device, for instance, in 1400 mm dia pipelines permits the length of such device to be decreased to 1.5 m, which is nearly two times shorter than the length of a comparative multilayer crack arresting device without slots in the layers.

We claim:

1. A crack arresting device for limiting propagation of cracks in a welded construction fabricated of a plurality of interconnected sections formed of sheets, said crack arresting device being made in the form of a multi-layer section integrally interposed between confronting edges of adjacent ones of the interconnected sections formed of sheets, wherein at least in one layer of said multi-layer section there is provided at least one slot, spaced from the edges of the layer connected to the confronting edges of the adjacent ones of the sections formed of sheets and located at an angle to a probable direction of propagation of cracks from a first of the adjacent ones of the sections formed of sheets, the slot defining an open space within the at least one layer for stopping propagation of cracks from the first to a second of the adjacent ones of the sections formed of sheets, at both sides of a slot in an outer layer of said multi-layer section there are formed melted-through weld joints spaced from the confronting edges of the adjacent ones of the sections formed of sheets, with the fusion penetration exceeding the thickness of the layer containing the slot to thereby ensure tightness of the crack arresting device.

2. A crack arresting device according to claim 1, wherein slots are provided at least in two said layers of said multilayer section, said slots being brought in coincidence.

3. A crack arresting device according to claim 1, wherein said welded construction is a pipeline and said multi-layer section is a pipe in said pipeline, wherein at least two closely spaced apart slots are provided in the same layer, a first of said slots extending around a first portion of the circumference of the pipe and having spaced apart ends, a second of said slots extending around a second portion of the circumference of the pipe that includes the space between the ends of the first slot so that the first and the second slots together extend around the entire circumference of the pipe.

4. A crack arresting device according to claim 1, wherein in the case of said welded construction fabricated of sheets being a pipeline, said multi-layer section is made in the form of a pipe whose layers are arranged along a spiral normal to the longitudinal axis of the pipe.

5. A crack arresting device according to claim 4, wherein slots are provided at least in two layers of said multilayer section, said slots coinciding at least in two layers of said multilayer section.

6. A crack arresting device according to claim 4, wherein at both sides of a slot provided in an outer layer of said multi-layer section there are formed melted-through weld joints spaced from the confronting edges of the adjacent ones of the sections formed of sheets, with the fusion penetration exceeding the thickness of said slot to thereby ensure thightness of the crack arresting device.

7. A crack arresting device according to claim 4, wherein at least two slots are provided in said multi-layer section, said slots being located parallel to each other.

8. A crack arresting device according to claim 4, wherein at least one layer of said multi-layer section is made continuous.

9. A crack arresting device according to claim 1, wherein the length of each said slot is equal at least to one perimeter of said multi-layer section.

* * * * *